(12) United States Patent
Thorne et al.

(10) Patent No.: US 12,181,952 B2
(45) Date of Patent: Dec. 31, 2024

(54) FENCE RANDOMIZATION WITH INTER-CHIP FENCING CONSTRAINTS

(71) Applicant: INTERNATIONAL BUSINESS MACHINES CORPORATION, Armonk, NY (US)

(72) Inventors: Daniel Alexander Thorne, Wappingers Falls, NY (US); Kevin Calabrese, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 17/977,017

(22) Filed: Oct. 31, 2022

(65) Prior Publication Data

US 2024/0143424 A1    May 2, 2024

(51) Int. Cl.
  *G06F 11/20*  (2006.01)
  *G06F 11/07*  (2006.01)
  *G06F 11/14*  (2006.01)

(52) U.S. Cl.
  CPC ...... *G06F 11/0721* (2013.01); *G06F 11/2002* (2013.01); *G06F 11/1423* (2013.01); *G06F 11/1425* (2013.01); *G06F 11/2025* (2013.01)

(58) Field of Classification Search
  CPC ............ G06F 11/1423; G06F 11/2002; G06F 11/2025
  See application file for complete search history.

(56) References Cited

U.S. PATENT DOCUMENTS

| | | | |
|---|---|---|---|
| 5,062,067 A | 10/1991 | Schaefer et al. | |
| 5,933,614 A * | 8/1999 | Tavallaei ............ | G06F 11/3495 714/E11.201 |
| 6,249,902 B1 | 6/2001 | Igusa et al. | |
| 7,155,694 B2 | 12/2006 | Eichenseer et al. | |
| 7,448,008 B2 | 11/2008 | Seigler et al. | |
| 7,761,828 B2 | 7/2010 | Miczo | |
| 8,572,528 B1 | 10/2013 | Leigh et al. | |
| 11,120,191 B2 | 9/2021 | Xu et al. | |
| 2006/0031803 A1 | 2/2006 | Eichenseer et al. | |

(Continued)

FOREIGN PATENT DOCUMENTS

| | | |
|---|---|---|
| EP | 3776280 A1 | 2/2021 |
| WO | 2019186111 A1 | 10/2019 |

OTHER PUBLICATIONS

Anonymous, Method to control hardware simulation errors at run-time with user defined parameters, An IP.com Prior Art Database Technical Disclosure, IP.com No. IPCOM000244704D, IP.com Electronic Publication Date: Jan. 6, 2016, 6 pages.

(Continued)

*Primary Examiner* — Joseph O Schell
(74) *Attorney, Agent, or Firm* — Randy Emilio Tejeda (57) ABSTRACT

Fence randomization with inter-chip fencing constraints, including: receiving a fencing setup comprising one or more parameters for fencing a plurality of chips in a plurality of drawers; and selecting, based on the one or more parameters and one or more dependencies for implementing the one or more parameters, a subset of the plurality of chips for fencing, wherein the subset of the plurality of chips are selected at least partially randomly; generating a testing configuration indicating the selected subset of the plurality of chips.

20 Claims, 10 Drawing Sheets

(56) References Cited

U.S. PATENT DOCUMENTS

| | | | |
|---|---|---|---|
| 2008/0028244 A1* | 1/2008 | Capps | G06F 1/206 |
| | | | 713/324 |
| 2008/0046851 A1 | 2/2008 | Miczo | |
| 2009/0187993 A1* | 7/2009 | Lefebvre | G06F 21/123 |
| | | | 438/106 |
| 2013/0097304 A1* | 4/2013 | Asthana | G06F 9/50 |
| | | | 709/224 |
| 2014/0181596 A1* | 6/2014 | Rusu | G06F 11/3058 |
| | | | 714/47.3 |
| 2020/0218845 A1 | 7/2020 | Xu et al. | |
| 2023/0315590 A1* | 10/2023 | Bruno | G06F 11/3414 |
| | | | 714/4.11 |

OTHER PUBLICATIONS

Anonymous, Method to Isolate and Fence a Single Port on a Multi-Port Adapter, An IP.com Prior Art Database Technical Disclosure, IP.com No. IPCOM000035330D, Original Publication Date: Jan. 20, 2005, IP.com Electronic Publication Date; Jan. 20, 2005, 4 pages.

Anonymous, Verification of fencing logic using X-State leakage and random environment, An IP.com Prior Art Database Technical Disclosure, IP.com No. IPCOM000204647D, IP.com Electronic Publication Date: Mar. 8, 2011, 5 pages.

* cited by examiner

FENCE RANDOMIZATION WITH INTER-CHIP FENCING CONSTRAINTS

BACKGROUND

Field of the Invention

The field of the invention is data processing, or, more specifically, methods, apparatus, and products for fence randomization with inter-chip fencing constraints.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In a complex system with a distributed cache that is connected over multiple chip-level interfaces, such as in a symmetric multiprocessing (SMP) system, dependencies exist for complete propagation of all required communication between logical controllers. With regards to inter-chip communication, fencing is the process of isolating units or chips when either one appears to be malfunctioning or not required. This results in a different system configuration. Multiple configurations of these chips can be installed due to testfloor requirements or variations of machines offered to customers. All possible configurations of the system should be tested in order to target both random and specific configurations. As a system grows in size, the complexity and number of possible configurations also increases.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

SUMMARY

Fence randomization with inter-chip fencing constraints, the method comprising: receiving a fencing setup comprising one or more parameters for fencing a plurality of chips in a plurality of drawers; and selecting, based on the one or more parameters and one or more dependencies for implementing the one or more parameters, a subset of the plurality of chips for fencing, wherein the subset of the plurality of chips are selected at least partially randomly; generating a fencing configuration indicating the selected subset of the plurality of chips.

DETAILED DESCRIPTION

Testing fenced configurations of a system needs to abide by top-level system requirements while also maintaining the ability to fully randomize fencing. For example, for a system with multiple chips across multiple drawers, chips in a given drawer may communicate with any other drawer using inter-drawer interfaces. Accordingly, chips on both sides of an inter-drawer interface must be available (e.g., unfenced). Fencing either one of these chips would prohibit communication between these drawers.

As a system grows in size, the number of possible system configurations and the complexity of these configurations grows. Moreover, the number of illegal configurations whereby inter-drawer communication is inhibited due to fencing chips on either side of an inter-drawer interface also grows. Accordingly, purely random fencing configurations becomes prohibitive. Although it may be possible to manually enumerate all possible legal fencing configurations, this approach also becomes laborious as the size of the system grows.

Figure 1:
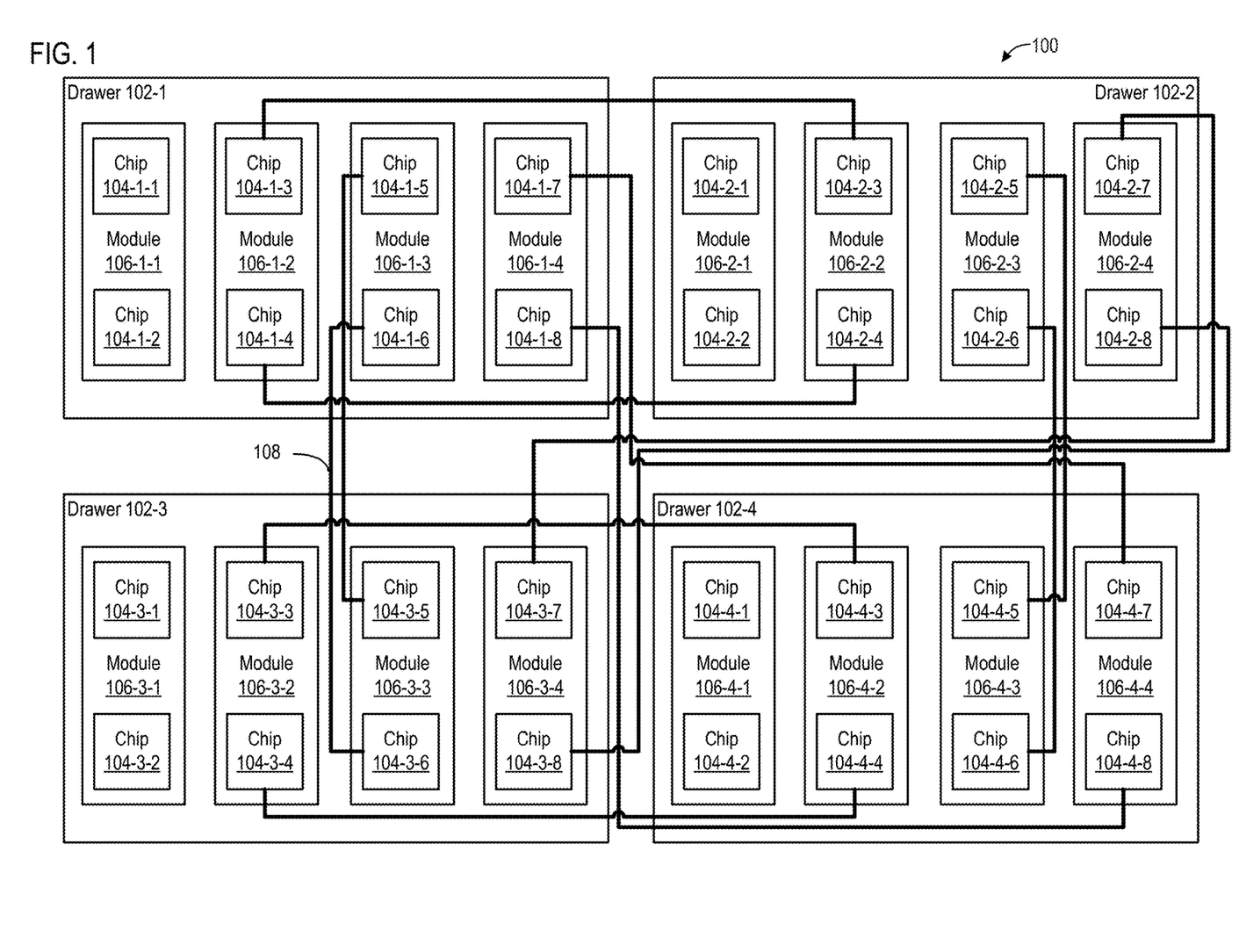
FIG. 1 shows a block diagram of a system for fence randomization with inter-chip fencing constraints according to some embodiments of the present disclosure.

To address these concerns, fence randomization with inter-chip fencing constraints in accordance with the present disclosure is described in the context of an example system 100 as shown in FIG. 1. Although the system 100 and the following discussion is presented with a particular number of drawers, chips, and the like, one skilled in the art will appreciate that this is merely exemplary and that other configurations are also contemplated within the scope of the present disclosure.

The system 100 includes multiple drawers 102-1, 102-2, 102-3, and 102-4, hereinafter collectively referred to as drawers 102. The drawers 102 may include drawers of chips or other processing hardware in a mainframe system architecture as would be appreciated. Each of the drawers 102 includes multiple chips. For example, as shown, the drawer 102-1 includes chips 104-1-1, 104-1-2, 104-1-3, 104-1-4, 104-1-5, 104-1-6, 104-1-7, and 104-1-8. The drawer 102-2 includes chips 104-2-1, 104-2-2, 104-2-3, 104-2-4, 104-2-5, 104-2-6, 104-2-7, and 104-2-8. The drawer 102-3 includes chips 104-3-1, 104-3-2, 104-3-3, 104-3-4, 104-3-5, 104-3-6, 104-3-7, and 104-3-8. The drawer 102-4 includes chips 104-4-1, 104-4-2, 104-4-3, 104-4-4, 104-4-5, 104-4-6, 104-4-7, and 104-4-8. Such chips are hereinafter collectively referred to as chips 104. Such chips 104 may include, for example, individual processors, individual cores, or other chips 104 as can be appreciated.

As shown, the chips 104 on each drawer 102 are grouped into modules. For example, the drawer 102-1 includes modules 106-1-1, 106-1-2, 106-1-3, and 106-1-4. The drawer 102-2 includes modules 106-2-1, 106-2-2, 106-2-3, and 106-2-4. The drawer 102-3 includes modules 106-3-1, 106-3-2, 106-3-3, and 106-3-4. The drawer 102-4 includes modules 106-4-1, 106-4-2, 106-4-3, and 106-4-4. Such modules are hereinafter collectively referred to as modules 106. As shown, each module 106 includes a pair of chips 104. However, one skilled in the art will appreciate that, in some embodiments, modules 106 may include any number of chips 104. Each chip 104 on a given drawer 102 may communicate with each other chip 104 on that drawer 102 using various interfaces or communications pathways (not shown). For example, each drawer 102 may include a communications fabric communicatively coupling each chip 104 on a drawer 102 with each other chip 104 on that drawer 102.

Each drawer 102 may communicate with each other drawer 102 using inter-drawer interfaces 108. Inter-drawer interfaces 108 may include, for example, buses or other components of a communications fabric as can be appreciated. For example, drawer 102-1 may communicate with drawer 102-2 over an inter-drawer interface 108 coupling chip 104-1-3 and chip 104-2-3 and over an inter-drawer interface 108 coupling chip 104-1-4 and chip 104-2-4. Drawer 102-1 may communicate with drawer 102-3 over an inter-drawer interface 108 coupling chip 104-1-5 and chip 104-3-5 and over an inter-drawer interface 108 coupling chip 104-1-6 and chip 104-3-6. Drawer 102-1 may communicate with drawer 102-4 over an inter-drawer interface 108 coupling chip 104-1-7 and chip 104-4-7 and over an inter-drawer interface 108 coupling chip 104-1-8 and chip 104-4-8. One skilled in the art will appreciate that the layout of inter-drawer interfaces 108 is merely exemplary and that other layouts are also contemplated within the scope of the present disclosure, and that such layouts may vary according to a number of drawers 102, a number of chips 104, and other design considerations.

Figure 2:
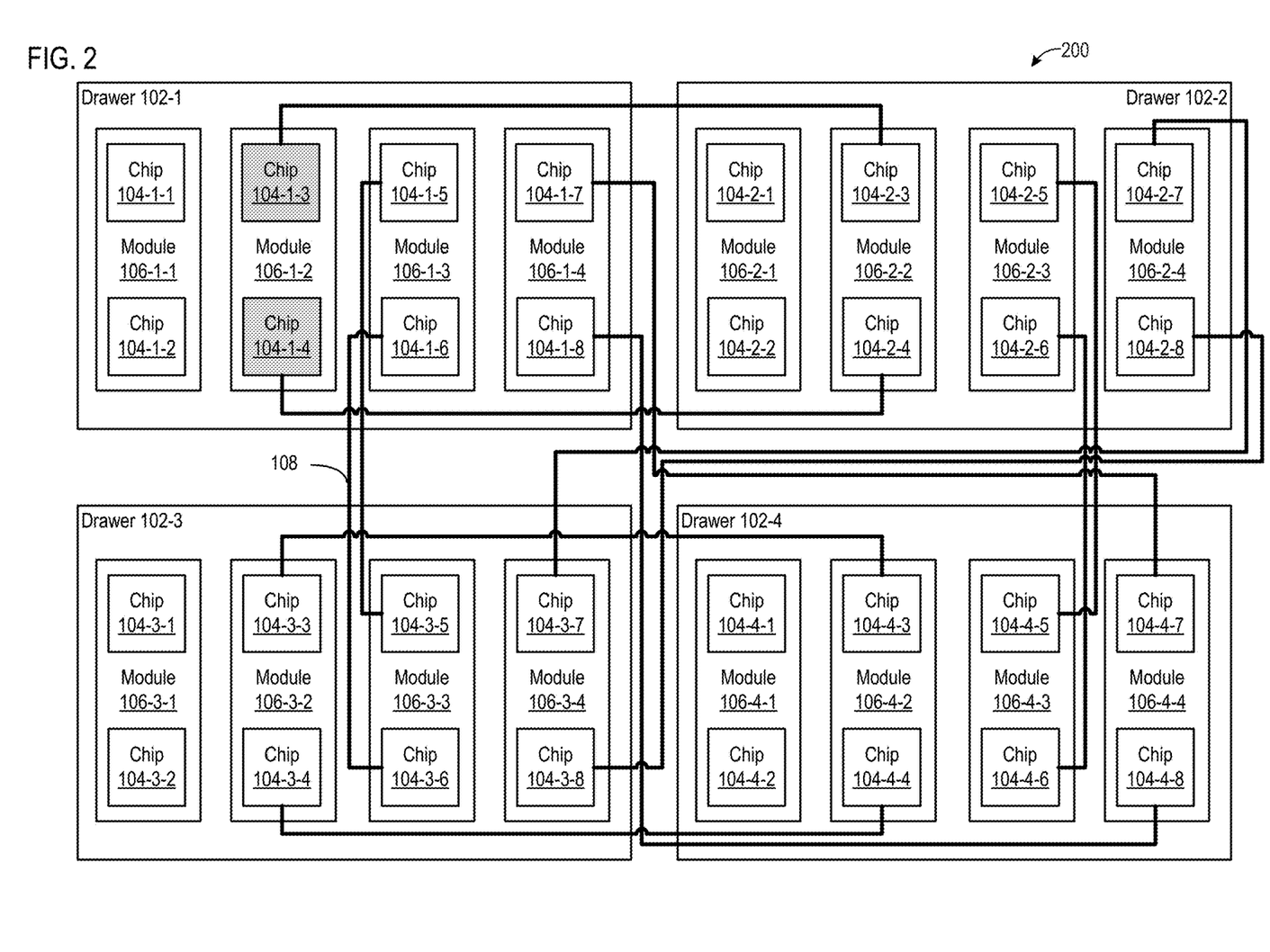
FIG. 2 shows a diagram of an example illegal fencing configuration.

As is described above, various fencing configurations should be tested for a given system. A fencing configuration may include, for example, fencing one or more chips 104, fencing one or more drawers 102 (and thereby fencing each chip 104 on the fenced drawer 102), and the like. Accordingly, a fencing configuration may include data indicating one or more chips 104 and/or one or more drawers 102 to be fenced or unfenced. However, certain fencing configurations may be illegal due to prohibiting communication to an unfenced drawer 102. FIG. 2 shows an example illegal fencing configuration 200 using the example system 100 of FIG. 1. Here, chips 104-1-3 and 104-1-4 are fenced, shown by virtue of their shading. This fencing configuration 200 is illegal because, due to fencing chips 104-1-3 and 104-1-4, drawer 102-1 is unable to communicate with drawer 102-2.

Figure 3:
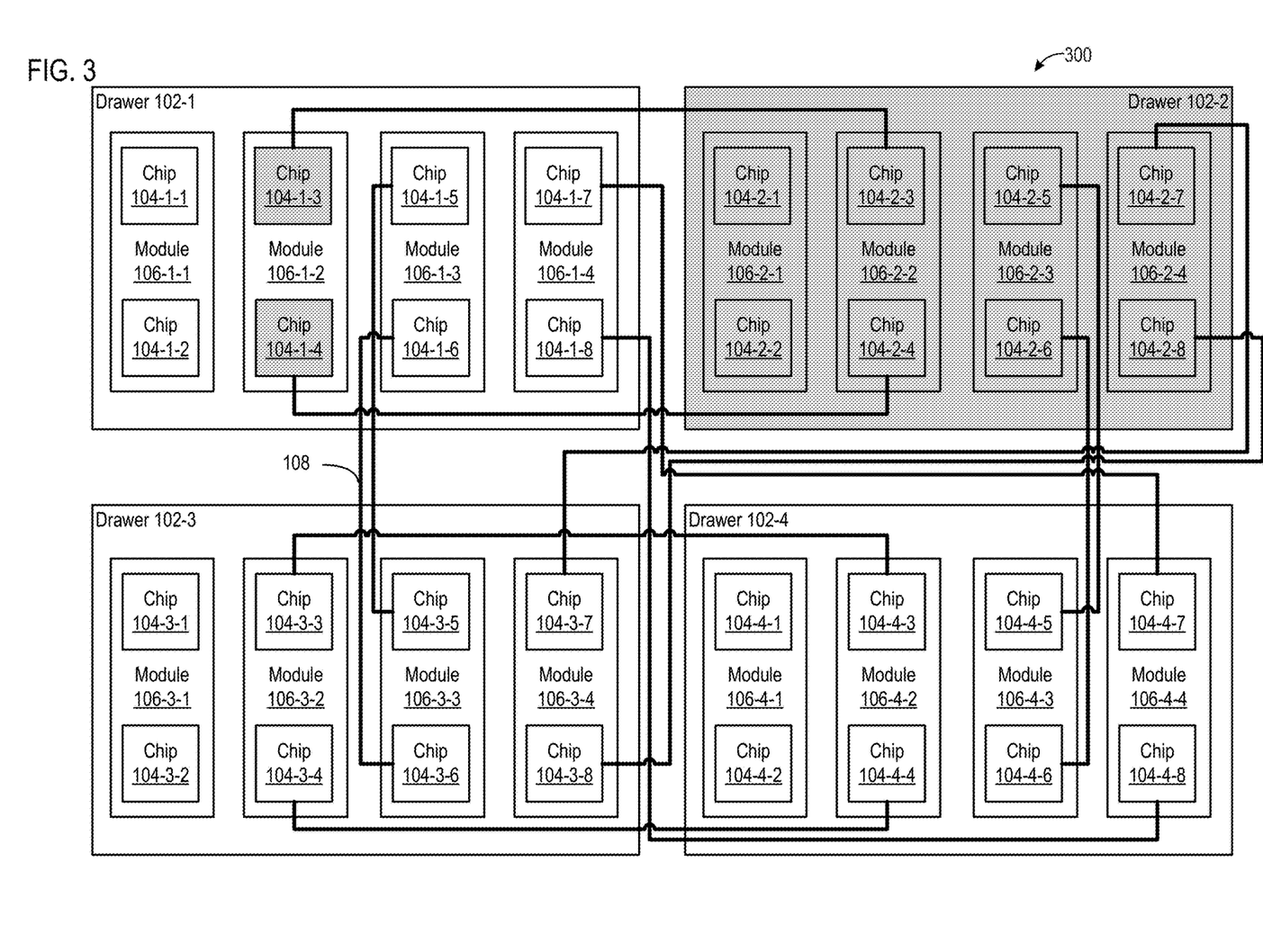
FIG. 3 shows a diagram of an example legal fencing configuration.

In contrast, FIG. 3 shows a legal fencing configuration 300 using the example system 100 of FIG. 1. Here, chips 104-1-3 and 104-1-4 are fenced as in the illegal fencing configuration 200 of FIG. 2. However, the legal fencing configuration 300 also has drawer 102-2 fenced. The fencing configuration 200 is legal because drawer 102-1 need not communicate with drawer 102-2 as drawer 102-2 is fenced. Thus, no inter-drawer communication is inhibited with an unfenced drawer 102 by virtue of fencing chips 104-1-3 and 104-1-4.

As shown in the contrast between the illegal fencing configuration 200 of FIG. 2 and the legal fencing configuration 300 of FIG. 3, any fencing configuration generated using fence randomization with inter-chip fencing constraints as described herein should preserve dependencies for inter-drawer communication. In order to facilitate generating multiple, different legal fencing configurations, such fencing configurations should be generated at least partially randomly. Moreover, in some embodiments, such fencing configurations should be generated according to various user-defined parameters to target particular fencing scenarios for testing. Such parameters include various constraints that indicate, for example, particular drawers 102 to remain fenced or unfenced, particular chips 104 to remain fenced or unfenced, particular relationships to be represented in the fencing configuration, minimum numbers of chips 104 to remain unfenced (e.g., on a per-drawer 102 basis or a per-system basis), a probability or distribution for randomly fencing chips 104, and the like. Such parameters may be defined in a fencing setup as described in further detail below.

Figure 4:
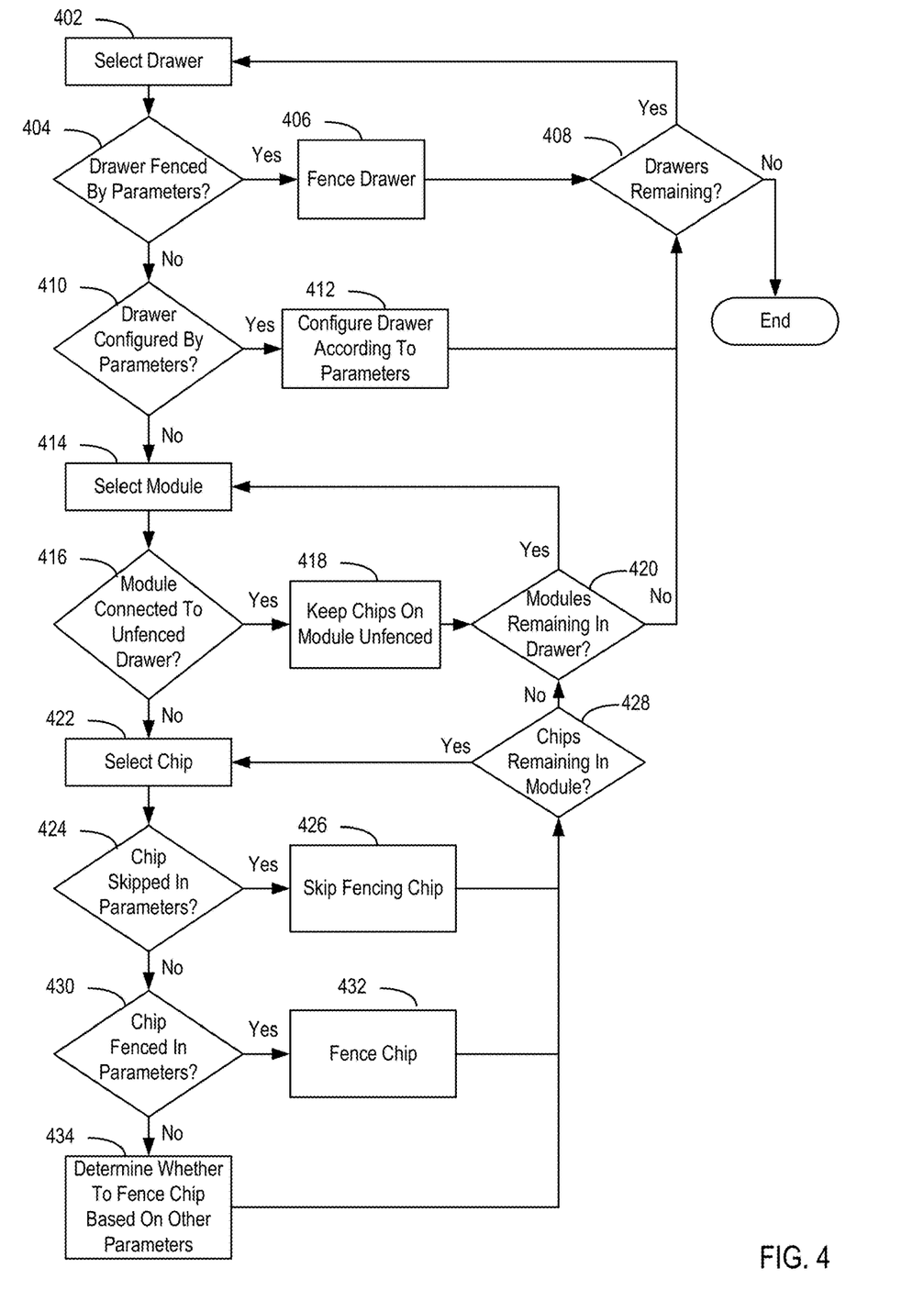
FIG. 4 shows an example flowchart for fence randomization with inter-chip fencing constraints according to some embodiments of the present disclosure.

Accordingly, FIG. 4 shows an example flowchart for fence randomization with inter-chip fencing constraints according to some embodiments of the present disclosure. One skilled in the art will appreciate that the flowchart of FIG. 4 is merely exemplary and that, in some embodiments, some steps may be omitted, added, reordered, and the like. Beginning at step 402, a drawer 102 is selected. As will be described herein, the process shown in FIG. 4 iterates through each drawer 102 in a particular system in order to determine which drawers 102 and chips 104 will be fenced. After selecting a particular drawer 102, at step 404 it is determined whether the selected drawer 102 is fenced according to the parameters of the fencing setup. In other words, it is determined if the fencing setup includes parameters indicating that the selected drawer 102 should be fenced. For example, the selected drawer 102 may be included in a list of drawers 102 to be fenced or excluded from a list of drawers 102 that should remain unfenced. In other words, in some embodiments, while selected chips 104 may be fenced or unfenced according to some level of randomization as described above, drawer-level fencing may require explicit indication in the parameters of the fencing setup, or may be randomized.

If the drawer 102 is fenced, at step 406 the selected drawer 102 is marked as fenced in the fencing configuration and no further action need be taken for that particular drawer 102. After fencing the selected drawer 102 the process moves to step 408 where it is determined if there are any remaining drawers 102 to be iterated upon for the fencing configuration. If not, meaning that all drawers 102 have been accounted for in the fencing configuration, the process ends. Otherwise, the process returns to step 402 where another drawer 102 is selected.

Turning back to step 404, if the selected drawer 102 is not explicitly fenced according to the parameters of the fencing setup the process advances to step 410 where it is determined if the particular drawer 102 is configured in the parameters of the fencing setup. A drawer 102 is configured in the fencing setup parameters if the fencing setup parameters indicate, for each chip 104 on that drawer 102, whether or not the chip 104 should be fenced or unfenced. Accordingly, a configuration for a drawer 102 in these parameters is not subject to randomization as described below. Thus, in some embodiments, a fencing setup may define particular configurations for particular drawers 102 according to desired design considerations and testing scenarios.

If the selected drawer 102 is configured by parameters of the fencing setup, the selected drawer 102 is configured in the fencing configuration according to these parameters. Thus, the parameters for the drawer 102 configuration are reflected in the overall fencing configuration. After configuring the drawer 102 according to these parameters the process advances to step 408 where it is determined if any drawers 102 remain to be iterated upon for the fencing configuration as described above.

If, at step 410, the selected drawer 102 is not configured by parameters of the fencing setup, the process advances to step 414 where a particular module 106 on the drawer 102 is selected. At step 416 it is then determined if the selected module 106 is connected to an unfenced drawer 416. For example, the parameters of the fencing setup are queried or referenced to determine if the module 106 is connected to a drawer 102 that should remain unfenced in the fencing configuration. If so, at step 418 the chips 104 of that module 106 are indicated as unfenced in the fencing configuration, thereby preserving inter-drawer communication between the selected drawer 102 of the selected module 106 and the other drawer 102 to which the selected module 106 is connected.

Next, at step 420, if additional modules 106 have yet to be iterated upon in the selected drawer 102 the process returns to step 414 where the next module 106 is selected. If not, meaning that all modules 106 for the selected drawer 102 have been iterated upon, the fencing configuration for the selected drawer 102 has been completed and the process advances to step 408 where it is determined if any drawers 102 remain.

If, at step 416, it is determined that the selected module 106 is not connected to an unfenced drawer 102 (e.g., by virtue of being connected to a fenced drawer 102 or not being coupled to an inter-drawer interface 108), a chip 104 for that module 106 is selected at step 422. At step 424 the parameters of the fencing setup are accessed to determine if the selected chip 104 is explicitly skipped for fencing (e.g., explicitly indicated as remaining unfenced). If so, the selected chip 104 is marked as unfenced at step 426. The process then advances to step 428 where it is determined if any chips 104 remain to be iterated upon in the selected module 414. If not, the process advances to step 420 where it is determined if any modules 106 have yet to be iterated upon in the selected drawer 102. If, at step 428 it is determined that chips 104 remain for the selected module 106, another chip 104 is selected at step 422.

Turning back to step 424, if the selected chip 104 is not skipped in the parameters the process advances to step 430 where it is determined if the selected chip 104 is fenced in the parameters of the fencing setup. In other words, it is determined if the parameters include an explicit indication that the selected chip 104 should be fenced. If so, the selected chip 104 is marked as fenced in the fencing configuration at step 432, after which the process advances to step 428.

If, at step 430, it is determined that the selected chip 104 is not fenced in the parameters of the fencing setup, the process advances to step 434 where it is determined whether to fence the selected chip 104 based on other parameters of the fencing setup. In some embodiments, determining whether to fence the selected chip 104 is based on a probability threshold or distribution for randomly fencing a chip 104 as indicated in the parameters. For example, the parameters may indicate that there should be a fifty percent probability of randomly fencing a chip 104. Accordingly, a selected chip 104 may be fenced based on whether a random or pseudorandom value falls below the probability threshold of the parameters.

In some embodiments, determining whether to fence the selected chip 104 is based on a relationship indicated in the parameters for inclusion in a fencing configuration. A relationship describes the relative placement in a fencing configuration of two unfenced chips 104. For example, a sibling relationship would include two unfenced chips 104 on a same module 106. As another example, a cousin relationship would include two unfenced chips on different modules 106 in a same drawer 102. Accordingly, parameters indicating that a particular relationship should be present would cause at least two chips 104 satisfying the particular relationship to be unfenced in the fencing configuration. In some embodiments, the relationship indicated in the parameters may be defined with respect to a particular chip 104. For example, an indication that a cousin relationship for a particular chip 104 to be present would require that the particular chip 104 and at least one other chip 104 in a different module 106 on the same drawer 102 to be unfenced. Accordingly, determining whether to fence the selected chip 104 is based on a relationship indicated in the parameters and may include determining whether the selected chip 104 would satisfy an indicated relationship that is not already satisfied in a current state of the fencing configuration.

After determining whether to fence the selected chip 104 at step 434 the process advances to step 428 where it is determined if any chips 104 remain to be iterated upon in the selected module 414. As shown, the process described in FIG. 4 iterates through each drawer 102 and, where required (e.g., by virtue of the drawer 102 being unfenced), each chip 104 of each module 106. In some embodiments, after completion of the process of FIG. 4, the resulting fencing configuration is completed.

Figure 5A:
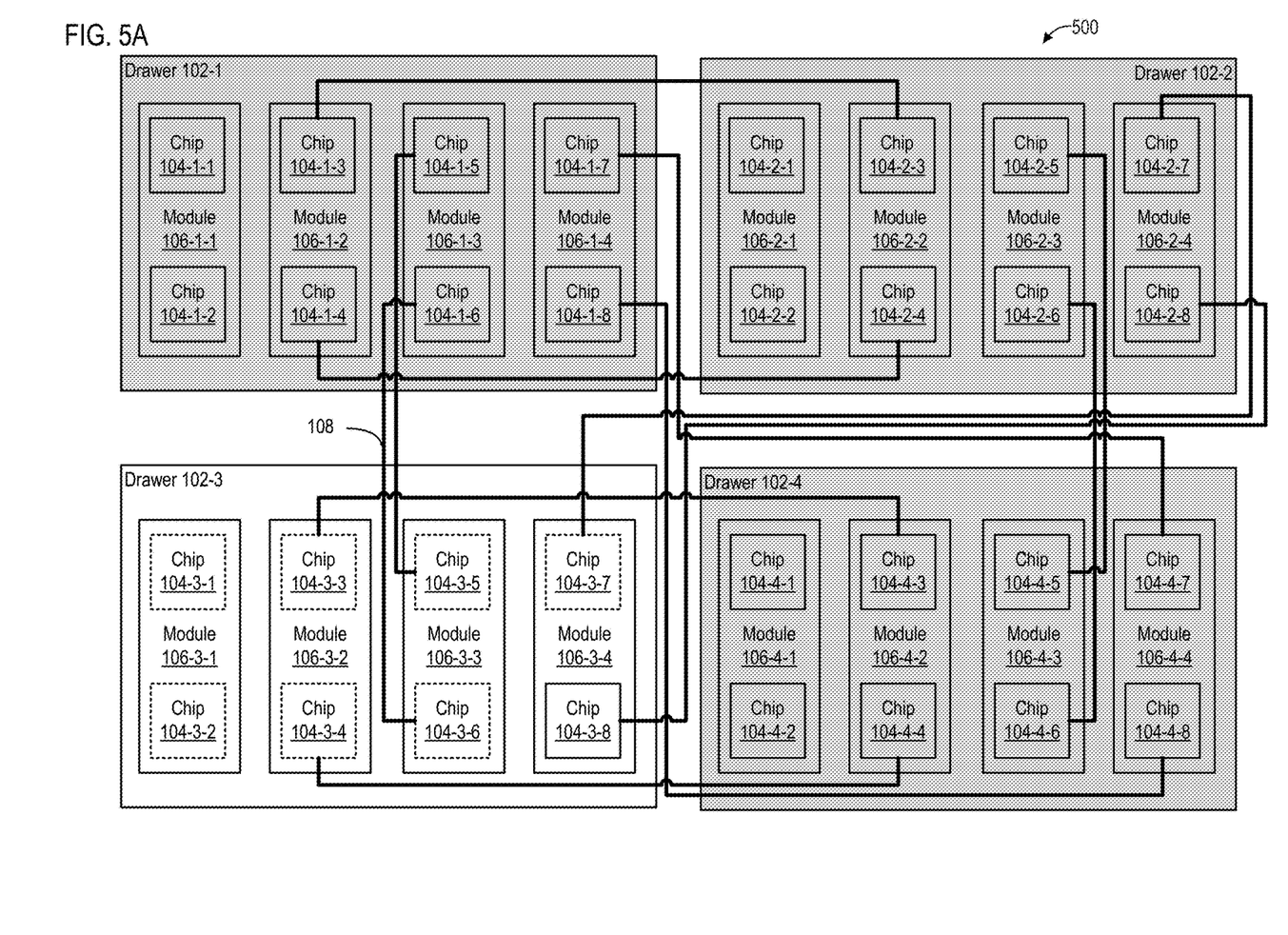
FIG. 5A shows an example diagram for possible fencing configurations using fence randomization with inter-chip fencing constraints according to some embodiments of the present disclosure.

Consider an example fencing setup with respect to the system 100 of FIG. 1 where the fencing setup parameters indicate the following: only drawer 102-3 should be unfenced, chip 104-3-8 should be unfenced, other chips 104 should be randomly fenced such that one cousin relationship relative is present, there is a ninety-percent probability of fencing a given chip 104, and a minimum of two unfenced chips 104 are on the drawer 102-3. Given this example fencing setup, FIG. 5A shows an illustrative diagram 500 of possible fencing configurations. Here, drawers 102-1, 102-2, and 102-4 are shaded as they will always be fenced in any resulting fencing configuration. Chip 104-3-8 is shown as unshaded with a solid border, indicating that it will always be unfenced in any resulting fencing configuration due to being explicitly unfenced in the fencing setup. Chips 104-3-1 through 104-3-7 are shown as unshaded with a dotted border indicating that they are possible candidates for fencing.

Figure 5B:
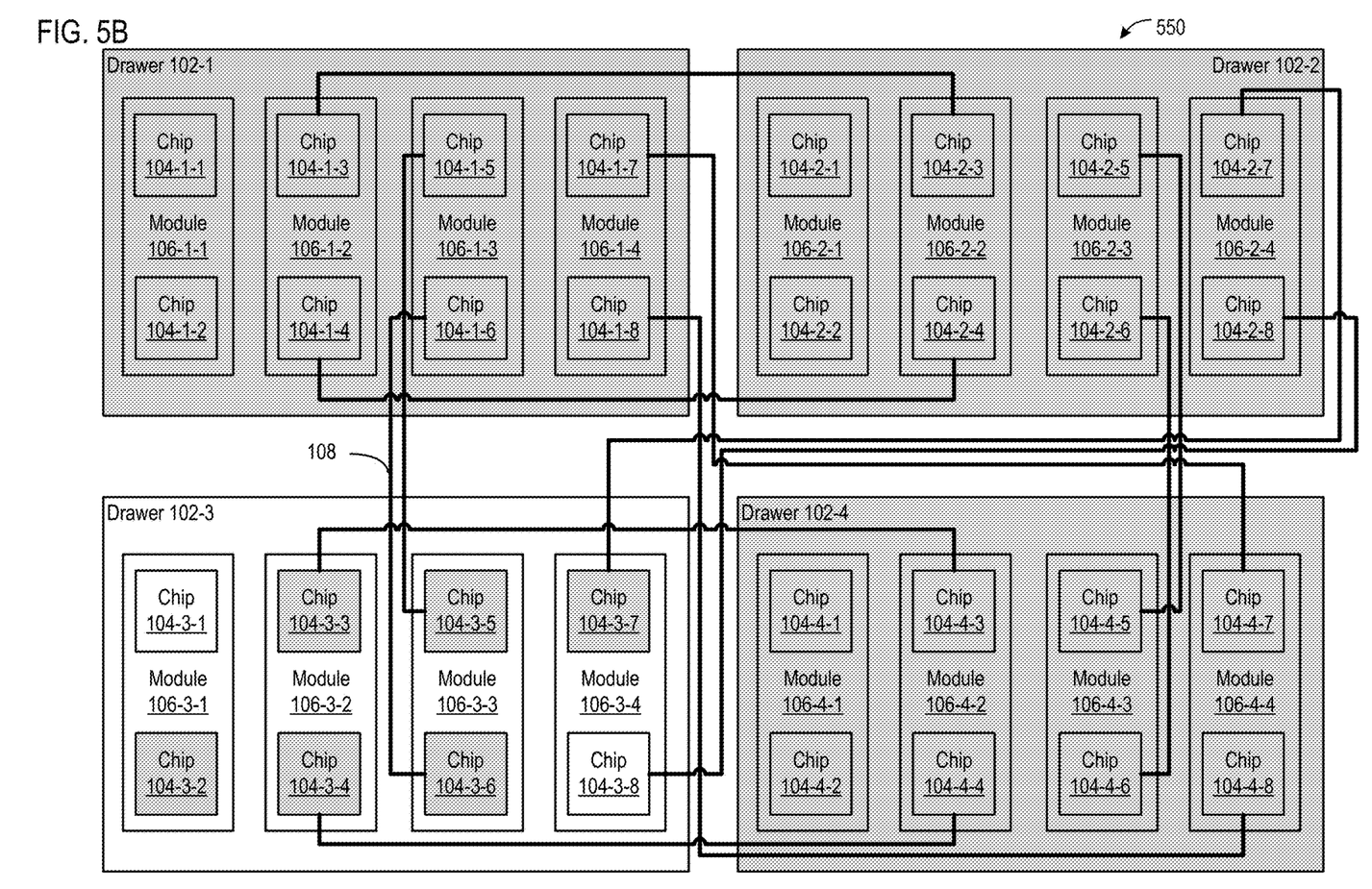
FIG. 5B shows an example fencing configuration using fence randomization with inter-chip fencing constraints according to some embodiments of the present disclosure.

Given the illustrative diagram 500 of possible fencing configurations as shown in FIG. 5A, FIG. 5B shows a possible fencing configuration 550. Here, drawers 102-1, 102-2, and 102-4 are fenced. On drawer 102-3, only chips 104-3-1 and 104-3-8 are unfenced. Chip 104-3-1 satisfies the cousin relationship relative to chip 104-3-8. Moreover, chips 104-3-1 and 104-3-8 satisfy the minimum of two unfenced chips 104 on the drawer 102-3.

Figure 6A:
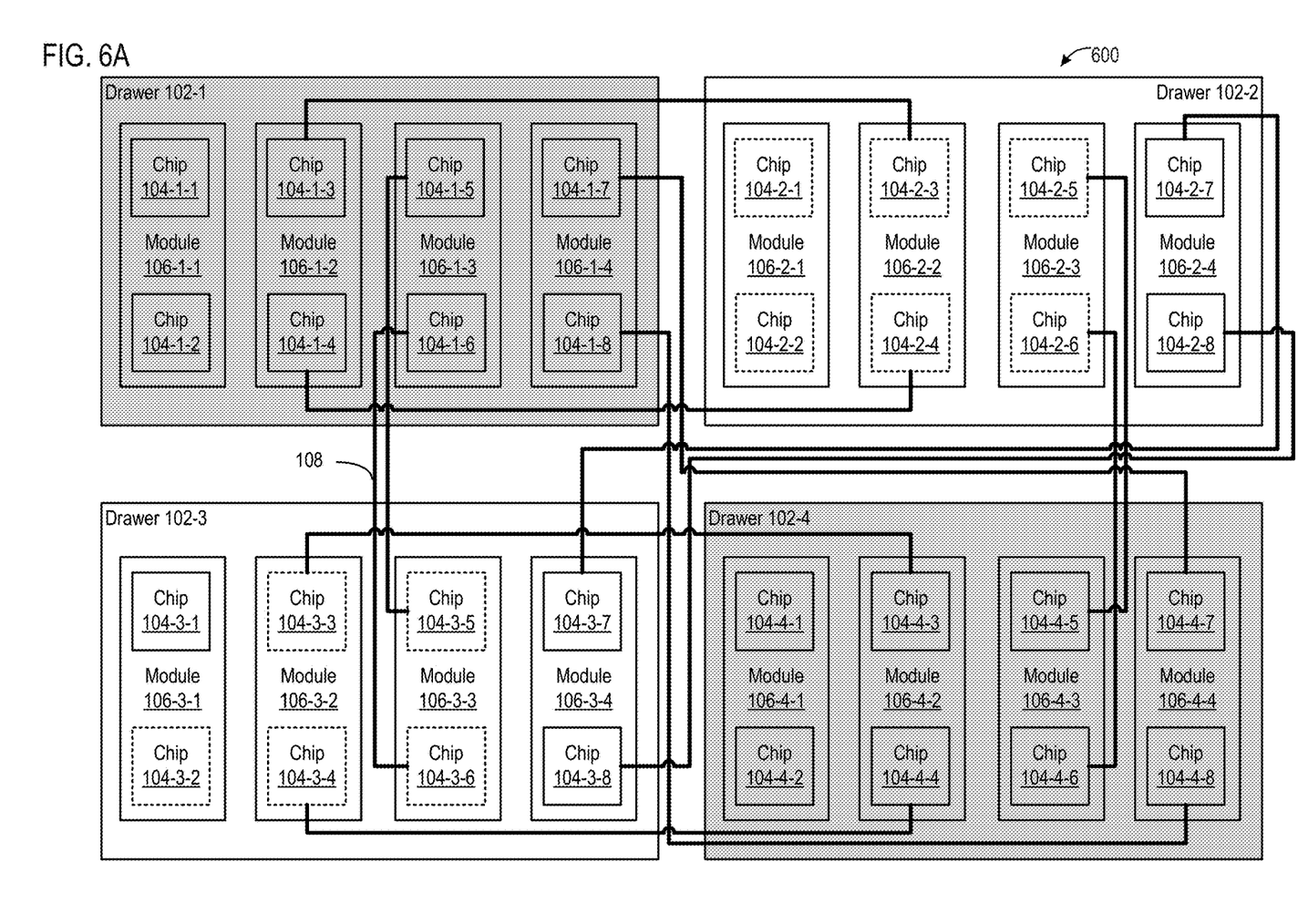
FIG. 6A shows an example diagram for possible fencing configurations using fence randomization with inter-chip fencing constraints according to some embodiments of the present disclosure.

Consider another example fencing setup with respect to the system 100 of FIG. 1 where the fencing setup parameters indicate the following: drawers 102-2 and 102-3 should be unfenced, chips 104-2-8 and 104-3-1 should be unfenced, other chips 104 should be randomly fenced such that one cousin relationship relative is present, there is a fifty-percent probability of fencing a given chip 104, and a minimum of two unfenced chips 104 are on each unfenced drawer 102-2 and 102-3. Given this example fencing setup, FIG. 6A shows an illustrative diagram 600 of possible fencing configurations. Here, drawers 102-1, and 102-4 are shaded as they will always be fenced in any resulting fencing configuration. Chips 104-2-8 and 104-3-1 are shown as unshaded with a solid border, indicating that they will always be unfenced in any resulting fencing configuration due to being explicitly unfenced in the fencing setup. Chips 104-2-7, 104-3-7 and 104-3-8 are also shown as unshaded with a solid border, indicating that they will always be unfenced in any resulting fencing configuration due to being coupled to another unfenced drawer 102-2 or 102-3. Note that chip 104-2-8 is both explicitly indicated as unfenced in the fencing setup parameters and is also necessarily unfenced due to being coupled to the unfenced drawer 102-3.

Figure 6B:
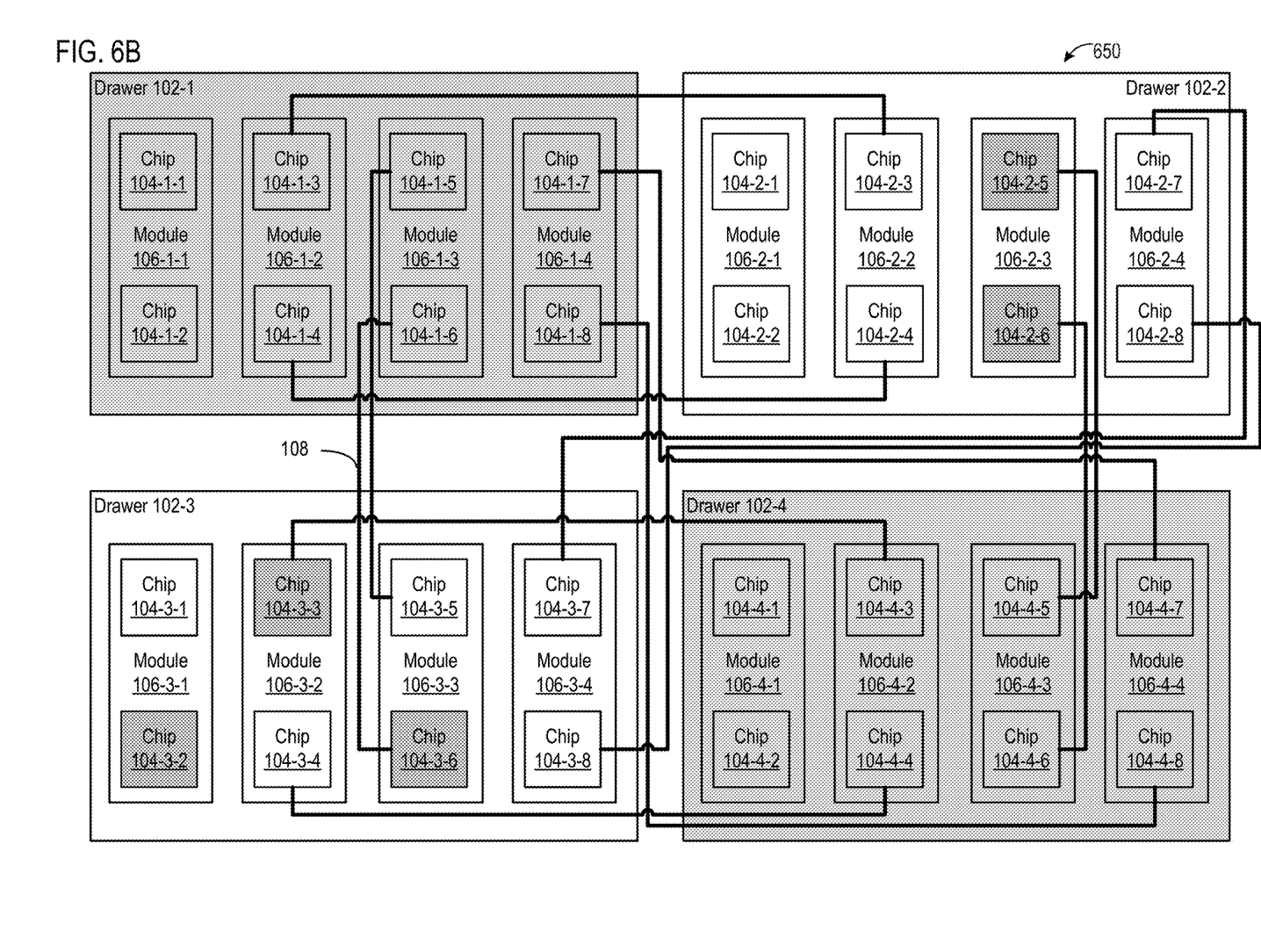
FIG. 6B shows an example fencing configuration using fence randomization with inter-chip fencing constraints according to some embodiments of the present disclosure.

Given the illustrative diagram 600 of possible fencing configurations as shown in FIG. 6A, FIG. 6B shows a possible fencing configuration 650. Here, drawers 102-1 and 102-4 are fenced. On drawer 102-2, only chips 104-2-5 and 104-2-6 are unfenced. On drawer 102-3, only chips 104-3-2, 104-3-3, and 104-3-6 are unfenced. This fencing configuration 650 also includes multiple cousin relationships and the minimum number of unfenced chips 104 per unfenced drawer 102 is also satisfied.

Fence randomization with inter-chip fencing constraints in accordance with the present application is generally implemented with computers, that is, with automated computing machinery. For further explanation, therefore, FIG. 7 sets forth a block diagram of computing machinery including an exemplary computer 700 configured for fence randomization with inter-chip fencing constraints according to certain embodiments. The computer 700 of FIG. 7 includes at least one computer processor 702 or 'CPU' as well as random access memory 704 (RAM') which is connected through a high speed memory bus 706 and bus adapter 708 to processor 702 and to other components of the computer 700.

Stored in RAM 704 is an operating system 710. Operating systems useful in computers configured for fence randomization with inter-chip fencing constraints according to certain embodiments include UNIX™, Linux™, Microsoft Windows™, and others as will occur to those of skill in the art. The operating system 710 in the example of FIG. 7 is shown in RAM 704, but many components of such software typically are stored in non-volatile memory also, such as, for example, on data storage 712, such as a disk drive.

Figure 7:
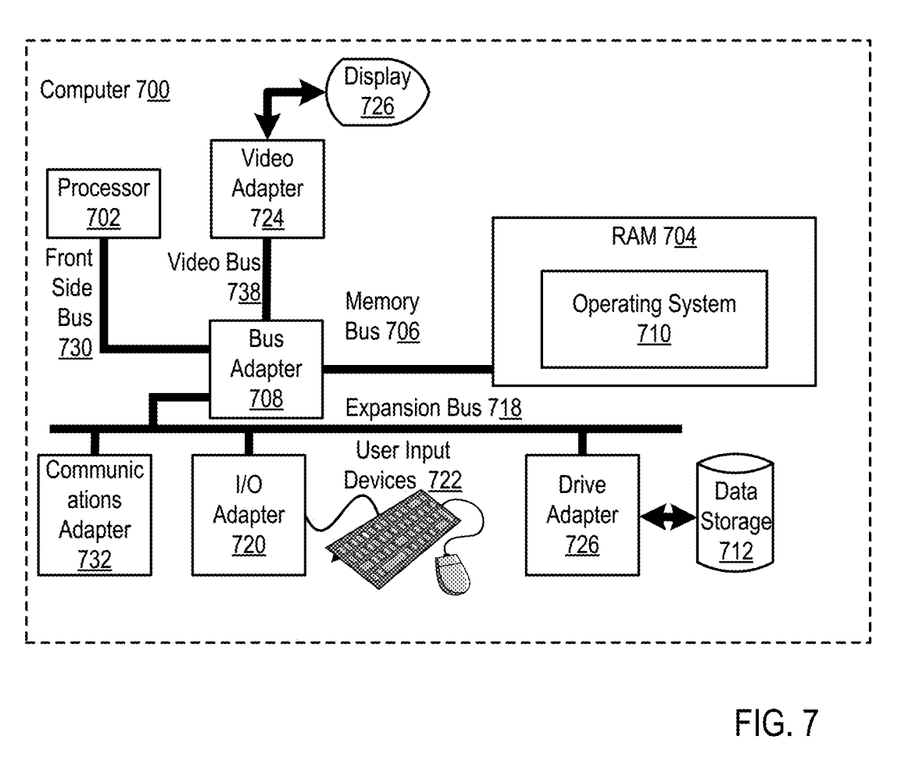
FIG. 7 shows a block diagram of an example computer for fence randomization with inter-chip fencing constraints according to some embodiments of the present disclosure.

The computer 700 of FIG. 7 includes disk drive adapter 716 coupled through expansion bus 718 and bus adapter 708 to processor 702 and other components of the computer 700. Disk drive adapter 716 connects non-volatile data storage to the computer 700 in the form of data storage 712. Disk drive adapters useful in computers configured for fence randomization with inter-chip fencing constraints according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 700 of FIG. 7 includes one or more input/output ('I/O') adapters 720. I/O adapters implement user-oriented input/output through, for example, software drivers and computer hardware for controlling output to display devices such as computer display screens, as well as user input from user input devices 722 such as keyboards and mice. The example computer 700 of FIG. 7 includes a video adapter 724, which is an example of an I/O adapter specially designed for graphic output to a display device 726 such as a display screen or computer monitor. Video adapter 724 is connected to processor 702 through a high speed video bus 728, bus adapter 708, and the front side bus 730, which is also a high speed bus.

The exemplary computer 700 of FIG. 7 includes a communications adapter 732 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for fence randomization with inter-chip fencing constraints according to certain embodiments include modems for wired dial-up communications, Ethernet (IEEE 802.3) adapters for wired data communications, and 802.11 adapters for wireless data communications.

Figure 8:
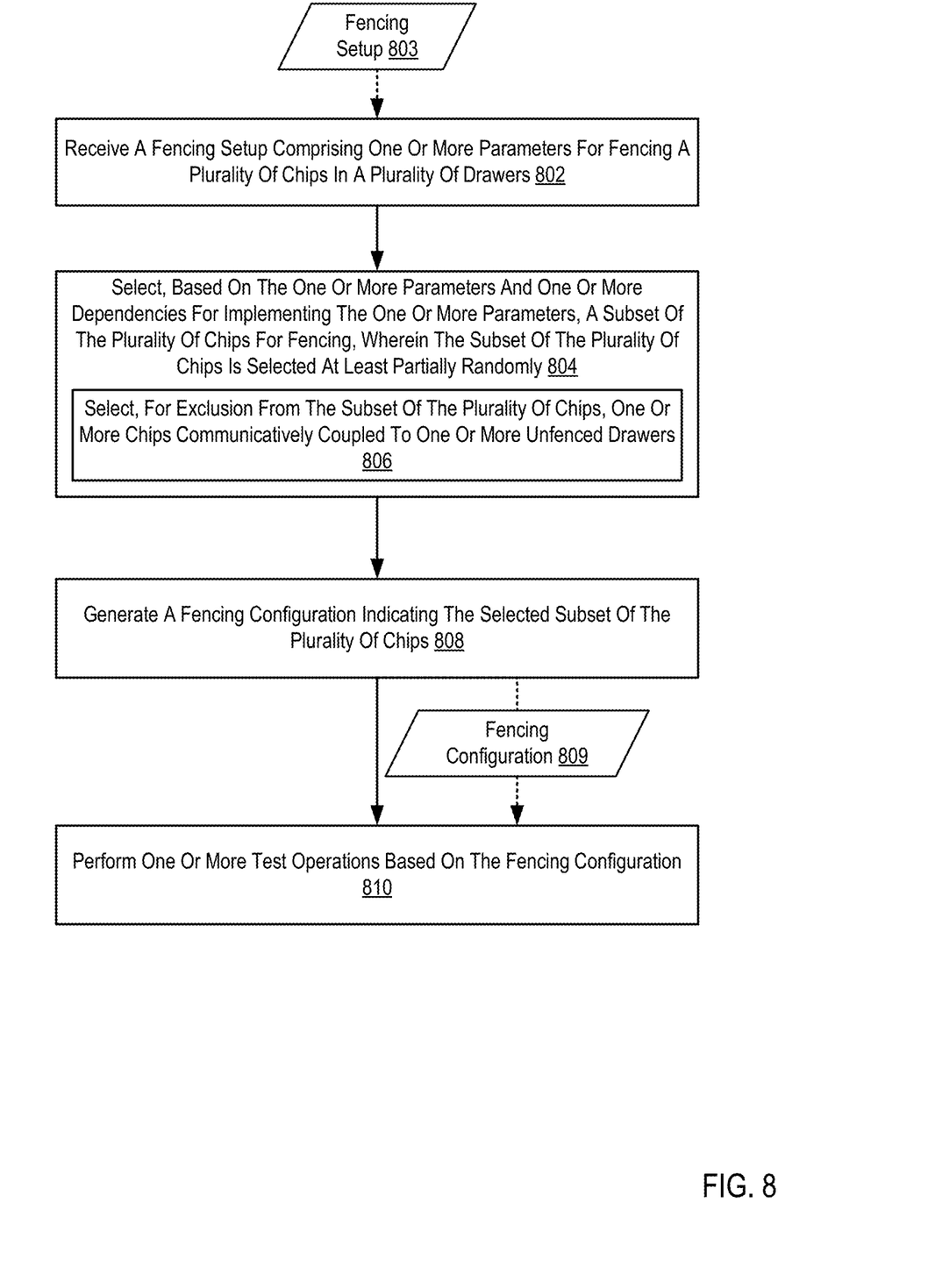
FIG. 8 shows a flowchart of an example method for fence randomization with inter-chip fencing constraints according to some embodiments of the present disclosure.

For further explanation, FIG. 8 shows a flowchart of an example method for fence randomization with inter-chip fencing constraints according to some embodiments of the present disclosure. The method of FIG. 8 may be performed, for example, by one or more computing devices operatively coupled to a configurable system capable of fencing, such as the system 100 of FIG. 1 or another system as can be appreciated. The method of FIG. 8 includes receiving 802 a fencing setup 803 comprising one or more parameters for fencing a plurality of chips 104 in a plurality of drawers 102. The fencing setup 803 comprises data indicating or describing these one or more parameters. Such parameters may indicate, for example, particular drawers 102 to remain fenced or unfenced, particular chips 104 to remain fenced or unfenced, particular relationships to be represented in a resulting fencing configuration 809, minimum numbers of chips 104 to remain unfenced (e.g., on a per-drawer 102 basis or a per-system basis), a probability or distribution for randomly fencing chips 104, and the like.

The method of FIG. 8 includes selecting 804, based on the one or more parameters and one or more dependencies for implementing the one or more parameters, a subset of the plurality of chips 104 for fencing, wherein the subset of the plurality of chips 104 is selected at least partially randomly. In some embodiments, selecting the subset of the plurality of chips 104 includes selecting one or more of the drawers 102 for fencing. For example, in some embodiments, the one or more parameters may indicate one or more drawers 102 to be unfenced, thereby causing a remainder of the drawers 102 to be fenced. As another example, in some embodiments, the one or more parameters may indicate one or more drawers 102 to be fenced, thereby causing a remainder of the drawers 102 to be unfenced. Accordingly, fencing a drawer 102 effectively causes each chip 104 in the fenced drawer 102 to be fenced, thereby selecting those chips 104 for inclusion in the subset of chips 104 to be fenced.

In some embodiments, selecting 804 the subset of chips 104 for fencing includes selecting one or more chips 104 explicitly indicated for fencing in the parameters. In some embodiments, selecting 804 the subset of chips 104 for fencing includes excluding, from the subset of chips 104 for fencing, one or more chips 104 explicitly indicated in the parameters as being unfenced.

In some embodiments, selecting 804 the subset of chips 104 for fencing includes excluding, from the subset of chips 104 for fencing, one or more chips 104 one or more chips 104 to satisfy a relationship indicated in the parameters. Such relationships may include, for example, a sibling relationship (e.g., two unfenced chips 104 in a same module 106) or a cousin relationship (e.g., two unfenced chips 104 in different modules 106 in a same drawer 102).

In some embodiments, selecting 804 the subset of chips 104 for fencing includes selecting 804 the subset of chips 104 based on a minimum number of unfenced chips 104 indicated in the parameters. The minimum number of unfenced chips 104 may be on a per-drawer 102 basis, a per-module 106 basis, or a per-system basis. Accordingly, a subset of chips 104 may be selected so as to not fall below the minimum number of unfenced chips 104.

As is set forth above, the subset of the plurality of chips 104 is selected based on one or more dependencies for implementing the one or more parameters. Such dependencies include a requirement for chips 104 communicatively coupled to an unfenced drawer 102 (e.g., via inter-drawer interfaces 108) to be unfenced. Accordingly, in some embodiments, selecting 804 the subset of the plurality of chips 104 for fencing includes selecting 806, for exclusion from the subset of the plurality of chips 104, one or more chips 104 communicatively coupled to one or more unfenced drawers 102. Thus, where a given chip 104 is coupled to an unfenced drawer 102, the given chip 104 may not be selected for inclusion in the subset of chips 104 for fencing.

As is also set forth above, the subset of the plurality of chips 104 is selected 804 at least partially randomly. For example, for a given chip 104 that is not determined to be fenced or unfenced based on other parameters or dependencies (e.g., that is not explicitly fenced or unfenced in the parameters, that is not coupled to an unfenced drawer 102), the given chip 104 may be selected for inclusion in the subset of chips 104 for fencing based on a probability threshold or distribution indicated in the parameters. As an example, where the parameters indicate a ninety-percent probability of fencing a chip 104, the given chip 104 may be selected for inclusion in the subset of chips 104 for fencing in response to a random or pseudorandom value falling within the ninety-percent probability.

The method of FIG. 8 also includes generating 808 a fencing configuration 809 indicating the selected subset of the plurality of chips 104. The fencing configuration 809 comprises data indicating one or more drawers 102 and/or one or more chips 104 to be fenced in a given system. Such data may be encoded according to a variety of approaches as would be appreciated by one skilled in the art.

The method of FIG. 8 also includes performing 810 one or more test operations based on the fencing configuration 809. For example, performing 810 the one or more test operations may include applying the fencing configuration 809 to a particular system to be tested. Applying the fencing configuration 809 causes the drawers 102 and/or chips 104 indicated as fenced in the fencing configuration 809 to be fenced, thereby isolating or rendering inoperable the fenced component. After fencing, the one or more test operations may be performed 810. Such test operations may include any test operations as would be appreciated, such as performance tests, stability tests, compatibility tests, and the like.

One skilled in the art will appreciate that, in some embodiments, the method of FIG. 8 may be repeatedly performed in order to generate a variety of different fencing configurations 809 for a particular system, thereby allowing the system to be tested using various fencing configurations 809 that are ensured to be valid.

In view of the explanations set forth above, readers will recognize that the benefits of fence randomization with inter-chip fencing constraints according to embodiments of the present invention include improved performance of a computing system by providing randomized fencing configurations guaranteed to be valid and based on desired configuration parameters.

Exemplary embodiments of the present invention are described largely in the context of a fully functional computer system for fence randomization with inter-chip fencing constraints. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of fence randomization with inter-chip fencing constraints, the method comprising:
   receiving a fencing setup comprising one or more parameters for fencing a plurality of chips in a plurality of drawers;
   selecting, based on the one or more parameters and one or more dependencies for implementing the one or more parameters, a subset of the plurality of chips for fencing, wherein the subset of the plurality of chips are selected at least partially randomly;
   generating a fencing configuration indicating the selected subset of the plurality of chips; and
   performing one or more test operations on only the selected subset of the plurality of chips based on the fencing configuration.

2. The method of claim 1, further comprising applying the fencing configuration to a system, wherein the one or more test operations are performed on the system, wherein generating the fencing configuration includes encoding data indicating the selected subset of the plurality of chips.

3. The method of claim 1, wherein the one or more parameters indicates a subset of the plurality of drawers for fencing, wherein the testing configuration further indicates the selected subset of the plurality of drawers.

4. The method of claim 3, wherein selecting the subset of the plurality of chips comprises selecting, for exclusion from the subset of the plurality of chips, one or more chips communicatively coupled to one or more unfenced drawers.

5. The method of claim 1, wherein the one or more parameters indicate one or more chips to be unfenced.

6. The method of claim 1, wherein the one or more parameters indicate one or more chip relationships to be represented in the fencing configuration.

7. The method of claim 1, wherein the one or more parameters indicate a minimum number of unfenced chips.

8. The method of claim 1, wherein the one or more parameters indicate a probability for randomly fencing one or more of the plurality of chips.

9. An apparatus for fence randomization with inter-chip fencing constraints, the apparatus comprising a computer processor and computer memory operatively coupled to the computer processor, the computer memory having disposed within it computer program instructions that, when executed by the computer processor, cause the apparatus to carry out the steps of:
receiving a fencing setup comprising one or more parameters for fencing a plurality of chips in a plurality of drawers;
selecting, based on the one or more parameters and one or more dependencies for implementing the one or more parameters, a subset of the plurality of chips for fencing, wherein the subset of the plurality of chips are selected at least partially randomly;
generating a fencing configuration indicating the selected subset of the plurality of chips; and
performing one or more test operations on only the selected subset of the plurality of chips based on the fencing configuration.

10. The apparatus of claim 9, wherein the steps further comprise applying the fencing configuration to a system, wherein the one or more test operations are performed on the system, wherein generating the fencing configuration includes encoding data indicating the selected subset of the plurality of chips.

11. The apparatus of claim 9, wherein the one or more parameters indicates a subset of the plurality of drawers for fencing, wherein the testing configuration further indicates the selected subset of the plurality of drawers.

12. The apparatus of claim 11, wherein selecting the subset of the plurality of chips comprises selecting, for exclusion from the subset of the plurality of chips, one or more chips communicatively coupled to one or more unfenced drawers.

13. The apparatus of claim 9, wherein the one or more parameters indicate one or more chips to be unfenced.

14. The apparatus of claim 9, wherein the one or more parameters indicate one or more chip relationships to be represented in the fencing configuration.

15. The apparatus of claim 9, wherein the one or more parameters indicate a minimum number of unfenced chips.

16. The apparatus of claim 9, wherein the one or more parameters indicate a probability for randomly fencing one or more of the plurality of chips.

17. A computer program product for fence randomization with inter-chip fencing constraints, the computer program product comprising a non-transitory computer readable storage medium, the computer program product comprising computer program instructions that, when executed, cause a computer to carry out the steps of:
receiving a fencing setup comprising one or more parameters for fencing a plurality of chips in a plurality of drawers;
selecting, based on the one or more parameters and one or more dependencies for implementing the one or more parameters, a subset of the plurality of chips for fencing, wherein the subset of the plurality of chips are selected at least partially randomly;
generating a testing configuration indicating the selected subset of the plurality of chips; and
performing one or more test operations on only the selected subset of the plurality of chips based on the fencing configuration.

18. The computer program product of claim 17, wherein the steps further comprise applying the fencing configuration to a system, wherein the one or more test operations are performed on the system, wherein generating the fencing configuration includes encoding data indicating the selected subset of the plurality of chips.

19. The computer program product of claim 17, wherein the one or more parameters indicates a subset of the plurality of drawers for fencing, wherein the testing configuration further indicates the selected subset of the plurality of drawers.

20. The computer program product of claim 19, wherein selecting the subset of the plurality of chips comprises selecting, for exclusion from the subset of the plurality of chips, one or more chips communicatively coupled to one or more unfenced drawers.

* * * * *